United States Patent
Cao et al.

(10) Patent No.: US 12,529,652 B2
(45) Date of Patent: Jan. 20, 2026

(54) INTEGRATED HYPERSPECTRAL WATER QUALITY ANALYSIS METHOD

(71) Applicant: DALIAN UNIVERSITY OF TECHNOLOGY, Liaoning (CN)

(72) Inventors: Tun Cao, Liaoning (CN); Jingyuan Jia, Liaoning (CN); Sixuan Lu, Liaoning (CN); Chaoyuan Li, Liaoning (CN); Tailei Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 19/233,426

(22) Filed: Jun. 10, 2025

(65) Prior Publication Data
US 2025/0297947 A1    Sep. 25, 2025

(30) Foreign Application Priority Data
Dec. 19, 2024    (CN) .......................... 202411873919.1

(51) Int. Cl.
*G06T 5/70*     (2024.01)
*G01N 21/31*    (2006.01)
(Continued)

(52) U.S. Cl.
CPC ............ *G01N 21/31* (2013.01); *G01N 33/18* (2013.01); *G06F 17/16* (2013.01); *G06T 5/20* (2013.01);
(Continued)

(58) Field of Classification Search
CPC ........ G01N 21/31; G01N 33/18; G06F 17/16; G06T 5/20; G06T 5/70; G06T 7/0002; G06T 2207/20081
See application file for complete search history.

(56) References Cited

U.S. PATENT DOCUMENTS

| | | | |
|---|---|---|---|
| 2009/0095092 A1* | 4/2009 | Lange ....................... | G01N 1/10 73/864 |
| 2021/0255111 A1* | 8/2021 | Limburg ............ | G01N 21/8483 |

(Continued)

FOREIGN PATENT DOCUMENTS

| | | |
|---|---|---|
| CN | 116165148 A | 5/2023 |
| CN | 118130394 A | 6/2024 |

OTHER PUBLICATIONS

E. Batur and D. Maktav, "Assessment of Surface Water Quality by Using Satellite Images Fusion Based on PCA Method in the Lake Gala, Turkey," in IEEE Transactions on Geoscience and Remote Sensing, vol. 57, No. 5, pp. 2983-2989, May 2019, (Year: 2019).*

(Continued)

*Primary Examiner* — Andrae S Allison
(74) *Attorney, Agent, or Firm* — MUNCY, GEISSLER, OLDS & LOWE, P.C.

(57) ABSTRACT

The present invention provides an integrated hyperspectral water quality analysis method, which belongs to the field of hyperspectral water quality analysis. First, data preprocessing is conducted by water quality data collection and water quality image collection in early stage; second, three dimensionality reduction methods are adopted to conduct dimensionality reduction processing, and fused dimensionality reduction is conducted by parameter trade-off selection; third, machine learning algorithms are adopted to train and test hyperspectral water quality inversion models on spectral data after dimensionality reduction; finally, the hyperspectral water quality inversion models are selected and optimized. The present invention adopts an innovative fusion strategy in the aspect of data dimensionality reduction processing, which can achieve a better data dimensionality reduction effect, effectively remove noise and redundant (Continued)

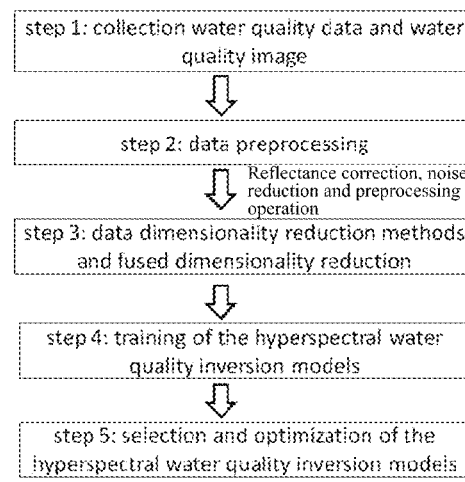

information, and provide a more accurate and reliable data basis.

5 Claims, 1 Drawing Sheet

(51) Int. Cl.
  *G01N 33/18* (2006.01)
  *G06F 17/16* (2006.01)
  *G06T 5/20* (2006.01)
  *G06T 7/00* (2017.01)

(52) U.S. Cl.
  CPC .............. *G06T 5/70* (2024.01); *G06T 7/0002* (2013.01); *G06T 2207/20081* (2013.01)

(56) References Cited

U.S. PATENT DOCUMENTS

| | | | | |
|---|---|---|---|---|
| 2023/0029474 A1* | 2/2023 | Wade | ...................... | G16C 20/70 |
| 2023/0243744 A1* | 8/2023 | Pan | ...................... | G01N 33/14 |
| | | | | 702/189 |

OTHER PUBLICATIONS

Cai, Xiaolan, et al. "Remote sensing identification of urban water pollution source types using hyperspectral data." Journal of Hazardous Materials 459 (2023): 132080. (Year: 2023).*

Valbonesi, Paola, et al. "Contaminants of emerging concern in drinking water: Quality assessment by combining chemical and biological analysis." Science of The Total Environment 758 (2021): 143624. (Year: 2021).*

Zhang, Yishan, et al. "Mapping water quality parameters in urban rivers from hyperspectral images using a new self-adapting selection of multiple artificial neural networks." Remote Sensing 12.2 (2020): (Year: 2020).*

Liu et al Using t-distributed Stochastic Neighbor Embedding (t-SNE) for cluster analysis and spatial zone delineation of groundwater geochemistry data, Journal of Hydrology vol. 597, Jun. 2021, 126146 (Year: 2021).*

Triana-Martinez, Jenniffer Carolina, et al. "Crop water status analysis from complex agricultural data using UMAP-based local biplot." Remote Sensing 16.15 (2024): 2854. (Year: 2024).*

* cited by examiner step 1: collection water quality data and water quality image

step 2: data preprocessing

Reflectance correction, noise reduction and preprocessing operation step 3: data dimensionality reduction methods and fused dimensionality reduction

step 4: training of the hyperspectral water quality inversion models

step 5: selection and optimization of the hyperspectral water quality inversion models

INTEGRATED HYPERSPECTRAL WATER QUALITY ANALYSIS METHOD

TECHNICAL FIELD

The present invention belongs to the field of hyperspectral water quality analysis, and provides an integrated hyperspectral water quality analysis method, which is an integrated method for monitoring water quality analysis through hyperspectral technology.

BACKGROUND

With the development of the society and the improvement of the environmental consciousness, the demand for water quality monitoring and analysis is becoming increasingly urgent. Hyperspectral technology, as an advanced analysis means, has shown great application potential in the field of water quality analysis because of the capability of capturing the rich spectral information in water quality. However, although some water quality analysis systems based on the hyperspectral technology are available at present, such systems still face many challenges in practical applications. The existing hyperspectral water quality analysis systems, although capable of processing and analyzing hyperspectral data to a certain extent, have obvious deficiencies in model reasoning ability. The systems often have difficulty in establishing an accurate quantitative relationship model between water quality parameters and spectral data, resulting in the inability to accurately analyze and quantify key components in water quality, such as total nitrogen, total phosphorus, ammonia nitrogen, dissolved oxygen, turbidity, suspension and Chemical Oxygen Demand (COD). Such limitation makes the existing systems only able to provide preliminary water quality evaluation results, but unable to meet the actual demand for in-depth and accurate water quality analysis.

Furthermore, the existing systems also have the problems of singularity and inaccuracy in data dimensionality reduction processing. In traditional dimensionality reduction methods, such as Principal Component Analysis (PCA), for example in the Chinese invention patent "Water Quality Monitoring System and Method Based on Hyperspectral Imaging" (CN 116165148A), although it is able to reduce the dimensionality of data to a certain extent, it is usually unable to fully retain the important information in the data, resulting in poor performance of the data after dimensionality reduction in subsequent model training and prediction. At the same time, the existing systems are lacking in comprehensive comparison and trade-off selection of different dimensionality reduction methods, and are unable to select the most suitable dimensionality reduction method based on specific data characteristics and analysis requirements. More crucially, the existing systems also have limitations in terms of model training and testing. For example, in the Chinese invention patent "Water-Air Cooperative Water Quality Monitoring System and Method Based on Spectral Imaging" (CN 118130394A), the existing systems can only consistently adopt a single machine learning algorithm for model training in general, but cannot fully utilize the advantages of different algorithms or select the most suitable algorithm for prediction based on the performance indexes of a model. Such limitation restricts the accuracy and reliability of the existing systems in water quality analysis. Therefore, it is urgently needed to provide a new type of water quality analysis method which adopts an innovative fusion strategy in the aspect of data dimensionality reduction processing. At the same time, the method shall also have a high degree of flexibility and accuracy in model training and testing, use multiple machine learning algorithms to train and test spectral data after dimensionality reduction, and select the most suitable method for model training and prediction based on various indexes.

SUMMARY

In order to achieve efficient and high-accuracy monitoring of water quality, the present invention designs an integrated water quality analysis method, which is implemented based on a hyperspectral water quality analysis system. The spectral range of the hyperspectral water quality analysis system is 400 nm to 1100 nm. The method adopts an innovative fusion strategy in the aspect of data dimensionality reduction processing, and integrates three methods, i.e., PCA, t-distributed Stochastic Neighbor Embedding (t-SNE), and Uniform Manifold Approximation and Projection (UMAP), for trade-off selection of parameters to achieve a better data dimensionality reduction effect. At the same time, the method also has a high degree of flexibility and accuracy in hyperspectral water quality inversion model training and testing, can use multiple machine learning algorithms such as Support Vector Machine (SVM), Random Forest and Decision Tree to train and test spectral data after dimensionality reduction, and can select the most suitable method for hyperspectral water quality inversion model training and prediction based on various indexes.

To achieve the above purpose, the present invention adopts the following technical solution:

An integrated hyperspectral water quality analysis method, comprising the following steps:

Step 1: water quality data collection and water quality image collection in early stage;

Water quality data and water quality images required for the establishment of hyperspectral water quality inversion models are prepared in early stage. Multiple points at different positions and depths in a collection area are selected as required, and a hyperspectral camera is used to collect spectral data of different points. At the same time, a sensor and a chemical method are used to acquire true values of contents of seven substances, i.e., total nitrogen, total phosphorus, ammonia nitrogen, dissolved oxygen, turbidity, suspension and COD, of the multiple points at different positions and depths in the collection area, so as to provide basic data for the subsequent establishment of the hyperspectral water quality inversion models.

Step 2: data preprocessing;

The water quality images and spectral data collected at different points are preprocessed, wherein the preprocessing includes reflectance correction, noise reduction and preprocessing operation. Specifically:

The reflectance correction: the main purpose is to analyze the water quality images collected in step 1, with the aim of converting a DN value (digital quantization value) into a reflectance value $$R_{ref} = \frac{DN_{raw} - DN_{dark}}{DN_{white} - DN_{dark}} * R_{white},$$

wherein, $R_{ref}$ is a reflectance value of a black-and-white corrected water quality image, $DN_{raw}$ is a DN value of a raw water quality image, $DN_{white}$ is white frame data of a reference plate, $DN_{dark}$ is a system error DN value of the camera, and $R_{white}$ is a reflectance coefficient of the reference plate. After the spectral data at different points is processed through the reflectance correction, accurate reflectance data is obtained.

The noise reduction: the accurate reflectance data is obtained after the reflectance correction, and the reflectance data will be used as a basis for subsequent processing. However, other interference and noise factors may exist in the water quality images in step 1, which will affect the accurate extraction of the chemical information of a sample. Therefore, further processing of the data is required. The noise reduction is conducted by Savitzky-Golay filtering, and a signal is smoothed through polynomial fitting by operating sliding windows on a spectrum of the water quality images. In the spectrum, the Savitzky-Golay filtering is used for removing high-frequency noise, making the spectrum smoother and helping to extract the main features of the sample. Noise elimination of the reflectance data is conducted by SG filtering to make the data smoother, and fluctuations caused by noise are reduced. Specifically:

Savitzky-Golay: the following formula is adopted for smooth filtering to improve the smoothness of the spectrum and reduce the interference of noise.

$$\hat{y}_j = \frac{\sum_{i=-m}^{m} a_i x_{j+i} + a_0}{n}$$

wherein $\hat{y}_j$ is a smoothed data set; $x_{j+i}$ is a collected data set; $a_1$ and $a_0$ are smoothing coefficients, i.e., weights of the raw data $x_{j+i}$ in a smoothing window of the $i^{th}$ period; n is the number of the data in a sliding window; and m is the width of the window, with n=2m+1.

The preprocessing operation: for the reflectance data after the noise reduction, some of the reflectance data with obvious scatter differences are processed by multiplicative scatter correction to enhance the correlation between the spectral data and the reflectance data. The processed data also has a deviation problem in overall spectral shape, and standard normal variate transformation is selected to highlight detailed information. Specifically:

The multiplicative scatter correction is to standardize each spectrum, and adjust the spectral shape of each band to a standard shape to counteract a deviation caused by scattering, which can effectively eliminate the spectral differences caused by different scattering levels, thereby enhancing the correlation between the spectrum and the data, and is helpful for extracting the chemical information of the water quality images more accurately.

First, an average spectrum of all spectra obtained is taken as an "ideal spectrum"

$$\overrightarrow{Data} = \frac{\sum_{i=1}^{n} Data_{ij}}{n},$$

wherein $Data_{ij}$ is a vector of a spectrum of a single sample, $\Sigma$ represents summation of spectra of all samples, n is the number of calibrated samples, and $\overrightarrow{Data}$ is an average value of all spectra.

Second, univariate linear regression is conducted to the spectrum of each sample and the average spectrum, and the least square problem is solved to obtain a baseline translation amount and an offset amount of each sample. $Data_i = k_i \overrightarrow{Data} + b_i$, wherein $Data_i$ is the spectrum of each sample, $k_i$ is the baseline translation amount of each sample, and $b_i$ is the offset amount of each sample.

Subsequently, the spectrum of each sample is corrected: after the obtained baseline translation amount is subtracted, the spectrum is divided by the offset amount to obtain a corrected spectrum.

$$Data_{i(MSC)} = \frac{Data_i - b_i}{k_i},$$

wherein $k_i$ is the baseline translation amount of each sample, $b_i$ is the offset amount of each sample, $Data_i$ is the spectrum of each sample, and $Data_{i(MSC)}$ is the spectrum after multiplicative radiometric correction.

The standard normal variate transformation is to centralize and standardize each spectrum, so as to make the average value thereof on each band be 0 and the standard deviation be 1, which is helpful for eliminating the differences in the overall shape and highlighting the detailed information in the spectrum.

For each element in a raw data set, an average value of elements in a column where the element is located is subtracted from the element, and then the result is divided by the standard deviation of the elements in the column $$\dot{x}_{ik} = \frac{x_{ik} - \overline{x_k}}{S_k} S_k = \sqrt{\frac{1}{n-1} \sum_{i=1}^{n} (x_{ik} - \overline{x_k})^2},$$

wherein $X_{ik}$ represents a raw spectral value of the $k^{th}$ variable of the $i^{th}$ sample, $\overrightarrow{x_k}$ represents an average value of the $k^{th}$ variable across all samples, and $S_k$ represents the standard deviation of the $k^{th}$ variable across all samples, i.e., the standard deviation of all samples at the $k^{th}$ wavelength position.

The reflectance after noise elimination is processed by the preprocessing operation, which enhances the correlation between the spectrum and the data and eliminates the problem in the overall spectral shape caused by scattering and offset in the spectrum.

Step 3: data dimensionality reduction methods and fused dimensionality reduction;

In hyperspectral water quality analysis, dimensionality reduction is a crucial step, which aims to reduce the dimensionality of the data and retain the most important information at the same time. Three dimensionality reduction methods are adopted in the present invention, which are: Principal Component Analysis (PCA), t-distributed Stochastic Neighbor Embedding (t-SNE), and Uniform Manifold Approximation and Projection (UMAP), and fused dimensionality reduction is conducted by parameter trade-off selection to achieve the best dimensionality reduction effect. Specifically:

The Principal Component Analysis (PCA): PCA is a statistical method, which is to convert a set of potentially correlated variables into a set of linearly uncorrelated variables (which are called principal components) through orthogonal transformation. The goal is to find a direction of the maximum variance in the data, i.e., a principal component. A mathematical expression of PCA is: $X_{new} = XP$, wherein $X_{new}$ is a new data matrix, XP is a raw data matrix, and P is a matrix composed of eigenvectors of a covariance matrix. PCA has a higher accuracy for cases where a linear relationship exists in the data and a strong correlation exists among water quality parameters The t-distributed Stochastic Neighbor Embedding (t-SNE): t-SNE is a dimensionality reduction method based on manifold learning, which is to reduce the dimensionality of the data by calculating the similarity among data points in a high-dimensional space and then retaining the similarity in a low-dimensional space. With t-SNE, a local structure in the data can be well captured and mapped to the low-dimensional space. t-SNE is applicable to cases where a complex nonlinear relationship exists among the data points, and is also applicable to cases where the relationship among the water quality parameters is complex and the accuracy of description by linear hyperspectral water quality inversion models is relatively low.

The Uniform Manifold Approximation and Projection (UMAP): UMAP is a new type of manifold learning algorithm, which is to reduce the dimensionality of the data by combining local and global structural information. With UMAP, dimensionality reduction is achieved by constructing a topological structure of high-dimensional data points and retaining the topological structure in the low-dimensional space. UMAP is applicable to cases where a large amount of noise and redundant information exist in the water quality data, and is capable of effectively extracting useful information and reducing the dimensionality of the data.

Step 3.1: for the data preprocessed in step 2, using PCA, t-SNE and UMAP to conduct independent dimensionality reduction to the data respectively;

Dimensionality reduction by PCA: eigenvalues and eigenvectors of a covariance matrix are calculated, the eigenvectors corresponding to the top k largest eigenvalues are selected, and the data is projected into a subspace composed of the eigenvectors.

Dimensionality reduction by t-SNE: the t-SNE algorithm is used to map high-dimensional data to a two-dimensional or three-dimensional space, and maintain a local structure among data points.

Dimensionality reduction by UMAP: the UMAP algorithm is used to map high-dimensional data to a low-dimensional space, and retain both global and local structures at the same time.

Step 3.2: after independent dimensionality reduction processing, adopting a cross validation method to determine a weight of each method in fusion. A data set is divided into several subsets, one subset is reserved as a test set each time, and the rest are reserved as training sets; this process is repeated for multiple times, and performance indexes (accuracy and recall rate) of each dimensionality reduction method in different compromises are calculated. For each method, the average value of the performance indexes thereof in cross validation is calculated. A weight is assigned to each method based on the average value of the performance indexes. The better the performance of a method is, the higher the assigned weight will be.

Step 3.3: conducting fused dimensionality reduction:

A weighted average of the dimensionality reduction results of the three methods is calculated according to the determined weights to obtain a final fused dimensionality reduction result. A formula for the weighted average is: $X_{fused} = w_{pca}X_{pca} + w_{t-SNE}X_{t-SNE} + w_{UMAP}X_{UMAP}$, wherein $X_{fused}$ is a dimensionality reduction result after fusion, $X_{pca}$, $X_{t-SNE}$ and $X_{UMAP}$ are the dimensionality reduction results of PCA, t-SNE and UMAP respectively, and $w_{PCA}$, $w_{t-SNE}$ and $w_{UMAP}$ are the corresponding weights.

In this step, the spectral data preprocessed in step 2 is subjected to dimensionality reduction processing through step 3, which effectively reduces the dimensionality of the data, and removes the noise and the redundant information, so that the structure of the data is more compact, and key water quality parameter information is retained at the same time. Moreover, the optimized data is helpful for improving the performance of subsequent machine learning hyperspectral water quality inversion models, making the models more accurate and reliable when water quality parameters are classified or predicted.

Step 4: training of the hyperspectral water quality inversion models;

After the dimensionality reduction processing in step 3 is completed, three machine learning algorithms, i.e. Support Vector Machine (SVM), Random Forest and Decision Tree, are adopted in the present invention to train and test the hyperspectral water quality inversion models on the spectral data after dimensionality reduction. The following is a detailed description of the processing modes, training processes, and selection strategies of the three algorithms.

Support Vector Machine (SVM): Support Vector Machine is a two-class classification algorithm based on the principle of maximum margin and can be expanded into a multi-class classification algorithm, which makes two types of samples located on both sides of a hyperplane and farthest from the hyperplane by finding an optimal hyperplane. When the spectral data after dimensionality reduction is processed, the data is mapped by SVM to the high-dimensional space through a kernel function to find the optimal hyperplane or a regression function. Training data sets are used to train the hyperspectral water quality inversion model of SVM, and the optimal hyperplane is determined by optimizing an objective function.

Random Forest: Random Forest is an integrated learning method composed of multiple decision trees, which improves the accuracy and robustness of the hyperspectral water quality inversion model by constructing multiple decision trees and averaging or voting on the results thereof. The spectral data after dimensionality reduction is taken as an input feature, and the water quality parameters are taken as target variables. Multiple decision trees are constructed, and during the training of each decision tree, some features and samples are randomly selected for training to reduce the overfitting of the hyperspectral water quality inversion model. The test set is used to test the hyperspectral water quality inversion model of Random Forest and evaluate the performance of the hyperspectral water quality inversion model. A final prediction result is obtained by integrating the prediction results of the multiple decision trees.

Decision Tree: Decision Tree is an algorithm for classification and regression based on a tree structure, which is divided by recursively selecting an optimal feature to construct a tree structure, and is used for classification or regression prediction of the data. When the spectral data after dimensionality reduction is processed, a decision tree is divided by selecting the optimal feature to obtain the final prediction result. Similar to SVM and Random Forest, the spectral data after dimensionality reduction is taken as an input feature, and the water quality parameters are taken as target variables. The Decision Tree algorithm is used to train the training sets and construct the hyperspectral water quality inversion model of Decision Tree. The test set is used to test the hyperspectral water quality inversion model of Decision Tree and evaluate the performance of the hyperspectral water quality inversion model. To avoid overfitting, the decision tree is pruned based on the result to remove unnecessary branches.

Step 5: selection and optimization of the hyperspectral water quality inversion models;

A determination coefficient ($R^2$) and a Root Mean Square Error (RMSE) are selected in a system as fitting accuracy test indexes of the hyperspectral water quality inversion models. Through the training of the hyperspectral water quality inversion models, predicted results of concentrations for water quality parameters of the points at different positions and depths in the collection area can be obtained, including the concentration values of seven water quality parameters at each point, wherein the seven water quality parameters are total nitrogen, total phosphorus, ammonia nitrogen, dissolved oxygen, turbidity, suspension and COD. Accurate and intuitive information on various water quality parameters are acquired.

The determination coefficient ($R^2$), also known as goodness of fit, is an important index reflecting the goodness of fit, and the variation thereof is used to reflect the fitting effect of the hyperspectral water quality inversion models. The relationship between an actual value and a predicted value is determined by the value of the determination coefficient. The calculation and derivation process is as follows: ...

$$\bar{x} = \frac{1}{n}\sum_{i=1}^{n} x_i$$

$$SS_{reg} = \sum_{i=1}^{n}(y_i - \bar{x})^2$$

$$SS_{tot} = \sum_{i=1}^{n}(x_i - \bar{x})^2$$

$$R^2 = \frac{SS_{reg}}{SS_{tot}} = \frac{\sum_{i=1}^{n}(y_i - \bar{x})^2}{\sum_{i=1}^{n}(x_i - \bar{x})^2}$$

wherein $x_i$ is sample data, $\bar{x}$ is an average value of the sample data, $y_i$ is fitted data, $SS_{reg}$ represents the sum of squares of regression, and $SS_{tot}$ is the sum of squares of total deviation. The larger the $R^2$ value is, the higher the explanation degree of an independent variable to a dependent variable is, and the larger the proportion of the variation caused by the independent variable in the total variation. Therefore, the closer $R^2$ is to 1, the better the fitting degree of the hyperspectral water quality inversion models is and the higher the reference value is; conversely, if $R^2$ is close to 0, it indicates that the fitting degree of the hyperspectral water quality inversion models is poor, and the reference value of the hyperspectral water quality inversion models is not high.

The Root Mean Square Error (RMSE) is a performance index for evaluating the hyperspectral water quality inversion models, which can intuitively reflect the degree of deviation between the predicted value and the actual value of the hyperspectral water quality inversion models.

$$RMSE = \sqrt{\sum_{i=1}^{n}(Y_i - \hat{Y}_i)^2/n}$$

wherein $Y_i$ is the actual value, $\hat{Y}_i$ is the predicted value, and n is the total number of samples. By calculating the square root of the average square difference between the predicted value and an observed value, RMSE can clearly indicate the performance of the hyperspectral water quality inversion models in terms of prediction accuracy. RMSE is used for testing the accuracy of the hyperspectral water quality inversion models; the smaller the value of RMSE is, the higher the accuracy of the hyperspectral water quality inversion models is; conversely, the larger the value is, the lower the accuracy of the hyperspectral water quality inversion models is. A hyperspectral water quality inversion model suitable for a water area is selected to conduct water quality monitoring based on the values of RMSE and $R^2$ of the three hyperspectral water quality inversion models.

Compared with the prior art, the present invention has the following beneficial effects:

The present invention adopts an innovative fusion strategy in the aspect of data dimensionality reduction processing, and integrates three methods, i.e., Principal Component Analysis (PCA), t-distributed Stochastic Neighbor Embedding (t-SNE), and Uniform Manifold Approximation and Projection (UMAP), for trade-off selection of parameters to achieve a better data dimensionality reduction effect. The fused dimensionality reduction strategy not only reduces the dimensionality of the data and effectively removes noise and redundant information, but also better retains the key water quality parameter information and provides a more accurate and reliable data basis for subsequent model training and prediction. The present invention also has a high degree of flexibility and accuracy in model training and testing. The present invention can use multiple machine learning algorithms such as Support Vector Machine (SVM), Random Forest and Decision Tree to train and test spectral data after dimensionality reduction, and can select the most suitable method for model training and prediction based on various indexes. The mode of training and testing with multiple algorithms enables the present invention to fully utilize the advantages of different algorithms, which improves the accuracy and reliability of water quality analysis. To sum up, the integrated hyperspectral water quality analysis method of the present invention is superior to the prior art in the aspects such as data dimensionality reduction processing, and model training and testing, and has significant beneficial effects.

DESCRIPTION OF DRAWINGS

The sole FIGURE is an overall flow chart of a system.

DETAILED DESCRIPTION

To make the purpose, the technical solution and advantages of the embodiments of the present invention more clear, the technical solution in the embodiments of the present invention will be clearly and fully described below in combination with the drawings in the embodiments of the present invention. An overall method flow chart is shown in the sole FIGURE.

The present invention provides an integrated hyperspectral water quality analysis method, which is implemented based on an integrated hyperspectral water quality analysis system. The spectral range of the hyperspectral water quality analysis system is 400 nm to 800 nm. The method introduces an innovative fusion strategy in the field of data dimensionality reduction processing, and combines three methods, i.e., Principal Component Analysis (PCA), t-distributed Stochastic Neighbor Embedding (t-SNE), and Uniform Manifold Approximation and Projection (UMAP), to select parameters of each method, so as to achieve a better data dimensionality reduction effect. At the same time, the method also has a high degree of flexibility and accuracy in hyperspectral water quality inversion model training and testing stages, can flexibly use multiple machine learning algorithms such as Support Vector Machine (SVM), Random Forest and Decision Tree to train and test spectral data after dimensionality reduction, and can accurately select the most suitable method for hyperspectral water quality inversion model training and prediction based on various performance indexes. In addition, contents of seven substances, i.e., total phosphorus, total nitrogen, ammonia nitrogen, dissolved oxygen, turbidity, suspension and COD (chemical oxygen demand), can be analyzed.

The integrated hyperspectral water quality analysis method comprises the following steps:

Step 1: water quality data collection and water quality image collection: water quality images are collected through hyperspectral equipment with a spectral range of 400 nm to 1100 nm. When water quality data is collected from Xishan Reservoir, a total of 100 sampling points are determined at different positions in the central area and on the periphery of the reservoir. The sampling points cover different ranges of water depths from 0.5 meters to 5 meters below the water surface, so as to ensure that representative water quality data is collected. For each sampling point, spectral data is collected using a hyperspectral camera to acquire spectral data of water quality at different depths, and the spectral data will be used as a basis for subsequent analysis. For samples collected, relevant physiological and chemical instruments are used to acquire true values of contents of total phosphorus, total nitrogen, ammonia nitrogen, turbidity, suspension, COD and dissolved oxygen respectively.

Step 2: data preprocessing;

The water quality images and spectral data collected at different points in Xishan Reservoir are preprocessed in early stage, mainly including reflectance correction, noise reduction and preprocessing.

Reflectance Correction:

The main purpose is to analyze the water quality images of Xishan Reservoir collected in step 1, with the aim of converting a DN value (digital quantization value) into a reflectance value $$R_{ref} = \frac{DN_{raw} - DN_{dark}}{DN_{white} - DN_{dark}} * R_{white}.$$

After the spectral data at different points is processed through the reflectance correction, accurate reflectance data is obtained.

Noise Reduction:

The accurate reflectance data is obtained after the reflectance correction. However, due to the large amount of sediment in the water near the shore of Xishan Reservoir captured and the significant ripples on the water surface in the central position, other interference and noise factors exist in the water quality images, which will affect the accurate extraction of the chemical information of a sample. Therefore, further processing of the data is required. The noise reduction is conducted by Savitzky-Golay filtering, and a signal is smoothed through polynomial fitting by operating sliding windows on a spectrum of the water quality images. Noise elimination of the reflectance data is conducted by SG filtering to make the data smoother, and fluctuations caused by noise are reduced.

Preprocessing:

For the reflectance data after the noise reduction, some of the reflectance data with obvious scatter differences are processed by multiplicative scatter correction to enhance the correlation between the spectral data and the reflectance data. The processed data also has a deviation problem in overall spectral shape, and standard normal variate transformation is selected to highlight detailed information.

First, an average spectrum of all spectra obtained is taken as an "ideal spectrum"

$$\overrightarrow{\text{Data}} = \frac{\sum_{i=1}^{n} \text{Data}_{ij}}{n}.$$

Second, univariate linear regression is conducted to the spectrum of each sample and the average spectrum, and the least square problem is solved to obtain a baseline translation amount and an offset amount of each sample, i.e., $\text{Data}_i = k_i \overrightarrow{\text{Data}} + b_i$.

Subsequently, the spectrum of each sample is corrected: after the obtained baseline translation amount is subtracted, the spectrum is divided by the offset amount to obtain a corrected spectrum, i.e., $$\text{Data}_{i(MSC)} = \frac{\text{Data}_i - b_i}{k_i},$$

The standard normal variate transformation is to centralize and standardize each spectrum, so as to make the average value thereof on each band be 0 and the standard deviation be 1, which eliminates the differences in the overall shape and highlights the detailed information in the spectrum. Finally, for each element in a raw data set, an average value of elements in a column where the element is located is subtracted from the element, and then the result is divided by the standard deviation of the elements in the column.

$$\dot{x}_{ik} = \frac{x_{ik} - \overline{x_k}}{s_k} S_k = \sqrt{\frac{1}{n-1} \sum_{i=1}^{n} (x_{ik} - \overline{x_k})^2}$$

The reflectance after noise elimination is processed by the preprocessing, which enhances the correlation between the spectrum and the data and eliminates the problem in the overall spectral shape caused by scattering and offset in the spectrum.

Step 3: data dimensionality reduction methods and fused dimensionality reduction;

The data preprocessed in step 2 is acquired, and dimensionality reduction processing is conducted to the data; in order to obtain data with a relatively high accuracy, data dimensionality reduction methods are selected and fused dimensionality reduction is conducted.

Dimensionality reduction by PCA: first, PCA is used to conduct dimensionality reduction to the data. By calculating the covariance matrix of the preprocessed spectral data from 100 sampling points of Xishan Reservoir, the eigenvectors corresponding to the top 5 largest eigenvalues are selected for dimensionality reduction. More than 95% of the total variance of the data is explained and key information of water quality parameters is effectively retained by the 5 principal components.

Dimensionality reduction by t-SNE: next, the t-SNE algorithm is used to map high-dimensional data in the preprocessed spectral data to a two-dimensional space. In the example of Xishan Reservoir, the perplexity parameter of the t-SNE algorithm is set to 25, the learning rate is 180, and the number of iterations is 700. With the t-SNE algorithm, a local structure in the water quality data can be well captured, which is very effective for analyzing the complex nonlinear relationship among the water quality parameters.

Dimensionality reduction by UMAP: finally, the UMAP algorithm is used to map high-dimensional data in the preprocessed spectral data to a two-dimensional space. The n_neighbors parameter of the UMAP algorithm is set to 19, and the min_dist parameter is set to 0.2. A global structure of the data is retained, and useful information in the water quality data is effectively extracted at the same time.

Fused Dimensionality Reduction:

Performance evaluation of the three dimensionality reduction methods, i.e., PCA, t-SNE and UMAP, is conducted by a cross validation method. In the example of Xishan Reservoir, it is found that the performance of t-SNE is the best in capturing the local structure, and the accuracy and recall rate thereof are both higher than those of PCA and UMAP. (PCA has an accuracy of 0.85 and a recall rate of 0.80; t-SNE has an accuracy of 0.91 and a recall rate of 0.89; and UMAP has an accuracy of 0.87 and a recall rate of 0.82.) Therefore, in the fused dimensionality reduction, a higher weight is given to t-SNE ($w_{PCA}$=0.2, $w_{t-SNE}$=0.5, $w_{UMAP}$=0.3). A weighted average of the dimensionality reduction results of the three methods is calculated to obtain a final fused dimensionality reduction result. The fused dimensionality reduction strategy not only reduces the dimensionality of the data and removes noise and redundant information, but also retains the key water quality parameter information and lays a solid foundation for subsequent hyperspectral water quality inversion model training and prediction.

Step 4: training of the hyperspectral water quality inversion models;

After the dimensionality reduction processing in step 3 is completed, three machine learning algorithms, i.e. Support Vector Machine (SVM), Random Forest and Decision Tree, are adopted to train and test the hyperspectral water quality inversion models on the spectral data after dimensionality reduction and the water quality data collected in step 1 respectively.

Training of the hyperspectral water quality inversion model of SVM: in the data processing of Xishan Reservoir, SVM is selected as a classifier. A Radial Basis Function (RBF) is used as a kernel function in the hyperspectral water quality inversion model of SVM, with the C parameter set to 1.5 and the gamma parameter set to 0.3. Training sets are used to train the hyperspectral water quality inversion model of SVM, and a hyperspectral water quality inversion model capable of accurately classifying the water quality parameters is obtained.

Training of the hyperspectral water quality inversion model of Random Forest: in the example of Xishan Reservoir, 100 sets of data are used to establish the hyperspectral water quality inversion model of Random Forest. The hyperspectral water quality inversion model of Random Forest is composed of 50 decision trees, and each tree is trained by extracting samples from the 100 sets of data through a self-service sampling method during training, so as to improve the accuracy and robustness of the hyperspectral water quality inversion model. In the training process of each tree, part of features are randomly selected from all features to find the best splitting point. In this way, training sets are used to train the hyperspectral water quality inversion model of Random Forest, and a stable hyperspectral water quality inversion model for water quality parameter prediction is obtained. Prediction results of each tree are summarized to form a final output of the hyperspectral, water quality inversion model.

The hyperspectral water quality inversion model of Decision Tree: The hyperspectral water quality inversion model of Decision Tree is established by recursively dividing the data set into smaller subsets. Each division decision is based on one feature and one threshold, thus to create nodes of the tree. In the example of Xishan Reservoir, the maximum depth of the tree is set to 5, so as to prevent overfitting of the hyperspectral water quality inversion model. The decision tree is enabled to grow by recursively selecting the features and the thresholds until the maximum depth or the minimum sample size limit of nodes is reached. To further avoid overfitting, pruning is carried out after the tree is fully grown to remove branches that contribute little to the performance of the hyperspectral water quality inversion model. Finally, the relationship between the features and the water quality parameters can be clearly shown by the trained hyperspectral water quality inversion model of Decision Tree.

Step 5: selection and optimization of the hyperspectral water quality inversion models;

After the training of the hyperspectral water quality inversion models is completed, a determination coefficient ($R^2$) and a Root Mean Square Error (RMSE) are used as performance evaluation indexes of the hyperspectral water quality inversion models. In the example of Xishan Reservoir, the hyperspectral water quality inversion models are evaluated against each water quality parameter respectively. The comprehensive $R^2$ and RMSE values obtained are shown in Table 1. Finally, combined with the actual situation of Xishan Reservoir, the hyperspectral water quality inversion model of Support Vector Machine (SVM) is selected to analyze the water quality parameters.

TABLE 1

| Hyperspectral water quality inversion models | $R^2$ | RMSE |
| --- | --- | --- |
| SVM | 0.93 | 0.12 |
| Random Forest | 0.90 | 0.10 |
| Decision Tree | 0.88 | 0.15 |

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. An integrated hyperspectral water quality analysis method, wherein the integrated hyperspectral water quality analysis method comprises the following steps:
   step 1: water quality data collection and water quality image collection in early stage;
   water quality data and water quality images required for the establishment of hyperspectral water quality inversion models are prepared in early stage; multiple points at different positions and depths in a collection area are selected as required, and a hyperspectral camera is used to collect spectral data of different points; at the same time, a sensor and a chemical method are used to acquire water quality parameters of the multiple points at different positions and depths in the collection area;

step 2: data preprocessing;

the water quality images and spectral data collected at different points are preprocessed, wherein the preprocessing includes reflectance correction, noise reduction and preprocessing operation;

step 3: data dimensionality reduction methods and fused dimensionality reduction;

three dimensionality reduction methods are adopted, which are: Principal Component Analysis (PCA), t-distributed Stochastic Neighbor Embedding (t-SNE), and Uniform Manifold Approximation and Projection (UMAP), and fused dimensionality reduction is conducted by parameter trade-off; specifically:

step 3.1: for the data preprocessed in step 2, using PCA, t-SNE and UMAP to conduct independent dimensionality reduction to the data respectively;

dimensionality reduction by PCA: eigenvalues and eigenvectors of a covariance matrix are calculated, the eigenvectors corresponding to the top k largest eigenvalues are selected, and the data is projected into a subspace composed of the eigenvectors;

dimensionality reduction by t-SNE: the t-SNE algorithm is used to map high-dimensional data to a two-dimensional or three-dimensional space, and maintain a local structure among data points;

dimensionality reduction by UMAP: the UMAP algorithm is used to map high-dimensional data to a low-dimensional space, and retain both global and local structures at the same time;

step 3.2: adopting a cross validation method to determine a weight of each method in fusion; a data set is divided into several subsets, one subset is reserved as a test set each time, and the rest are reserved as training sets; this process is repeated for multiple times, and performance indexes of each dimensionality reduction method in different compromises are calculated; for each method, the average value of the performance indexes thereof in cross validation is calculated; a weight is assigned to each method based on the average value of the performance indexes;

step 3.3: conducting fused dimensionality reduction:

a weighted average of the dimensionality reduction results of the three methods is calculated according to the determined weights to obtain a final fused dimensionality reduction result; a formula for the weighted average is: $X_{fused} = w_{pca}X_{pca} + w_{t-SNE}X_{t-SNE} + w_{UMAP}X_{UMAP}$, wherein $X_{fused}$ is a dimensionality reduction result after fusion, $X_{pca}$, $X_{t-SNE}$ and $X_{UMAP}$ are the dimensionality reduction results of PCA, t-SNE and UMAP respectively, and $w_{PCA}$, $w_{t-SNE}$ and $w_{UMAP}$ are the corresponding weights;

step 4: training of the hyperspectral water quality inversion models;

three machine learning algorithms, i.e. Support Vector Machine (SVM), Random Forest and Decision Tree, are adopted to train and test the hyperspectral water quality inversion models on the spectral data after dimensionality reduction;

step 5: selection and optimization of the hyperspectral water quality inversion models;

a determination coefficient $R^2$ and a root mean square error (RMSE) are selected as fitting accuracy test indexes of the hyperspectral water quality inversion models; through the training of the hyperspectral water quality inversion models, predicted results of concentrations for water quality parameters of the points at different positions and depths in the collection area can be obtained, including the concentration values of seven water quality parameters at each point; accurate and intuitive information on various water quality parameters are acquired.

2. The integrated hyperspectral water quality analysis method according to claim 1, wherein the water quality parameters of the step 1 include total nitrogen, total phosphorus, ammonia nitrogen, dissolved oxygen, turbidity, suspension and chemical oxygen demand.

3. The integrated hyperspectral water quality analysis method according to claim 1, wherein the step 2 is specifically as follows:

the reflectance correction: after the spectral data at different points is processed through the reflectance correction, accurate reflectance data is obtained;

the noise reduction: the noise reduction is conducted by Savitzky-Golay filtering to reduce fluctuations caused by noise;

the preprocessing operation: the data after the noise reduction is processed by multiplicative scatter correction to enhance the correlation between the spectral data and the reflectance data; the processed data has a deviation problem in overall spectral shape, and standard normal variate transformation is selected to highlight detailed information.

4. The integrated hyperspectral water quality analysis method according to claim 3, wherein the process of the preprocessing operation is specifically as follows:

the process of the multiplicative scatter correction is as follows: first, an average spectrum of all spectra obtained is taken as an ideal spectrum; second, univariate linear regression is conducted to the spectrum of each sample and the average spectrum, and the least square problem is solved to obtain a baseline translation amount and an offset amount of each sample; finally, the spectrum of each sample is corrected: after the obtained baseline translation amount is subtracted, the spectrum is divided by the offset amount to obtain a spectrum after multiplicative scatter correction;

the standard normal variate transformation is to centralize and standardize each spectrum, so as to make the average value thereof on each band be 0 and the standard deviation be 1.

5. The integrated hyperspectral water quality analysis method according to claim 1, wherein the step 5 is specifically as follows:

the determination coefficient $R^2$: the closer $R^2$ is to 1, the better the fitting degree of the hyperspectral water quality inversion models is and the higher the reference value is; conversely, if $R^2$ is close to 0, it indicates that the fitting degree of the hyperspectral water quality inversion models is poor;

the root mean square error (RMSE): the smaller the value of RMSE is, the higher the accuracy of the hyperspectral water quality inversion models is; conversely, the larger the value is, the lower the accuracy of the hyperspectral water quality inversion models is;

a hyperspectral water quality inversion model suitable for a water area is selected to conduct water quality monitoring based on the values of RMSE and $R^2$ of the three hyperspectral water quality inversion models.

\* \* \* \* \*